US011766757B2

(12) United States Patent
Yamada et al.

(10) Patent No.: US 11,766,757 B2
(45) Date of Patent: Sep. 26, 2023

(54) PROCESSING SYSTEM, MEASURING PROBE, SHAPE MEASURING DEVICE, AND PROGRAM

(71) Applicants: NIKON CORPORATION, Tokyo (JP); DMG MORI CO., LTD., Yamatokoriyama (JP)

(72) Inventors: Tomoaki Yamada, Yokohama (JP); Shizuo Nishikawa, Yamatokoriyama (JP); Satoshi Miyamoto, Yamatokoriyama (JP); Junichi Morishita, Yamatokoriyama (JP)

(73) Assignees: NIKON CORPORATION, Tokyo (JP); DMG MORI CO., LTD., Yamatokoriyama (JP)

( * ) Notice: Subject to any disclaimer, the term of this patent is extended or adjusted under 35 U.S.C. 154(b) by 612 days.

(21) Appl. No.: 16/957,176

(22) PCT Filed: Dec. 25, 2017

(86) PCT No.: PCT/JP2017/046371
§ 371 (c)(1),
(2) Date: Sep. 15, 2020

(87) PCT Pub. No.: WO2019/130381
PCT Pub. Date: Jul. 4, 2019

(65) Prior Publication Data
US 2021/0069847 A1 Mar. 11, 2021

(51) Int. Cl.
*B23Q 17/20* (2006.01)
*G01B 11/00* (2006.01)
*G05B 19/401* (2006.01)

(52) U.S. Cl.
CPC .......... *B23Q 17/20* (2013.01); *G01B 11/005* (2013.01); *G05B 19/401* (2013.01)

(58) Field of Classification Search
CPC .... B23Q 17/20; G01B 11/005; G05B 19/401; G05B 15/02
See application file for complete search history.

(56) References Cited

U.S. PATENT DOCUMENTS 5,481,360 A * 1/1996 Fujita ..................... G01B 11/24
356/489
9,483,823 B2 * 11/2016 Itai ......................... G06T 7/0016
(Continued)

FOREIGN PATENT DOCUMENTS

EP 2 515 070 A1 10/2012
JP 2000155019 A * 6/2000
(Continued)

OTHER PUBLICATIONS

Aug. 15, 2022 Office Action issued in Chinese Patent Application No. 201780098150.2.
(Continued)

*Primary Examiner* — Ronald D Hartman, Jr.
(74) *Attorney, Agent, or Firm* — Oliff PLC

(57) ABSTRACT

A processing system includes a control unit that generates positional information related to a position of a measuring unit at a time of measuring a processing object and outputs the generated positional information and a generation period signal indicating a period during which the positional information is generated, an acquisition unit that acquires the positional information and the generation period signal which have been output, an acquisition interval calculation unit that calculates a statistical value indicating an interval between acquisition periods regarding a plurality of generation period signals acquired by the acquisition unit, an estimation unit that estimates the period during which the positional information is generated on the basis of the statistical value calculated by the acquisition interval calculation unit, and a shape calculation unit that calculates a
(Continued)

shape of the processing object based on measurement information, the positional information, and the period estimated by the estimation unit.

9 Claims, 6 Drawing Sheets

(56) References Cited

U.S. PATENT DOCUMENTS

| | | | |
|---|---|---|---|
| 2003/0086095 A1 | 5/2003 | Ruck | |
| 2006/0210143 A1* | 9/2006 | Miyamoto | H01J 37/222 382/145 |
| 2010/0309482 A1* | 12/2010 | Oikaze | G01B 11/2441 356/601 |
| 2012/0262724 A1 | 10/2012 | Nemoto et al. | |
| 2014/0126677 A1 | 5/2014 | Fritsch | |
| 2019/0078867 A1* | 3/2019 | Noda | G01B 21/045 |
| 2022/0349707 A1* | 11/2022 | Mitani | G01B 11/25 |

FOREIGN PATENT DOCUMENTS

| | | | |
|---|---|---|---|
| JP | 2002071343 A | * | 3/2002 |
| JP | 2012150057 A | * | 8/2012 |
| JP | 2012-225701 A | | 11/2012 |

OTHER PUBLICATIONS

Mar. 20, 2018 Search Report issued in International Patent Application No. PCT/JP2017/046371.

Mar. 20, 2018 Written Opinion of the International Searching Authority issued in International Patent Application No. PCT/JP2017/046371.

Jan. 30, 2022 Office Action issued in Chinese Patent Application No. 201780098150.2.

Jun. 28, 2021 Extended Search Report issued in European Patent Application No. 17936150.6.

* cited by examiner

PROCESSING SYSTEM, MEASURING PROBE, SHAPE MEASURING DEVICE, AND PROGRAM

TECHNICAL FIELD

The present invention relates to a processing system, a measuring probe, a shape measuring device, and a program.

BACKGROUND ART

In the related art, a non-contact shape measuring device which scans a surface of a measurement object in a non-contact manner to measure a surface shape of the measurement object is known (for example, refer to Patent Literature 1).

CITATION LIST

Patent Literature

[Patent Literature 1]
Japanese Unexamined Patent Application, First Publication No. 2012-225701

Such a non-contact shape measuring device may be used for measuring a surface shape of a processing object of a numerically controlled (NC) machine tool. In such cases, for example, an image for calculating the surface shape of a processing object is acquired by relatively moving a measurement probe attached to a tool main shaft of the NC machining tool with respect to the processing object through coordinate control using the NC machining tool. In such a non-contact shape measuring device, shape data of a processing object is calculated by performing coordinate conversion computation based on a relative position of a measuring probe with respect to the processing object for an image of the processing object acquired by the measuring probe.

In such a non-contact shape measuring device, there are cases in which coordinates of a measuring probe are controlled by an NC machining tool and an image of a processing object for calculating a shape of the processing object is acquired by the measuring probe. In such cases, in order to calculate the processing object shape data, the non-contact shape measuring device acquires an image of the processing object from the measuring probe and acquires coordinates of the measuring probe from the NC machining tool, respectively.

However, a temporal error occurs between a timing when an image is acquired from a measuring probe and a timing when coordinates of the measuring probe are acquired from an NC machining tool. Moreover, regarding this temporal error, variation occurs among the errors. For this reason, non-contact shape measuring devices in the related art have a problem with deterioration in accuracy of shape data of a processing object which is calculated.

SUMMARY OF INVENTION

According to a first aspect of the present invention, a processing system is provided including a machine tool that includes a measuring unit outputting measurement information for calculating a shape of a processing object; a control unit that generates positional information related to a position of the measuring unit at a time of measuring the processing object and outputs the generated positional information and a generation period signal indicating a period during which the positional information is generated; an acquisition unit that acquires the positional information and the generation period signal which have been output; an acquisition interval calculation unit that calculates a statistical value indicating an interval between acquisition periods regarding a plurality of the generation period signals acquired by the acquisition unit; an estimation unit that estimates the period during which the positional information is generated on the basis of the statistical value calculated by the acquisition interval calculation unit; and a shape calculation unit that calculates the shape of the processing object on the basis of the measurement information, the positional information, and the period estimated by the estimation unit.

According to another aspect of the present invention, there is provided a shape calculation system including a measuring unit that is able to be attached to a machine tool and generates measurement information for calculating a shape of a processing object of the machine tool; an acquisition unit that acquires, as information related to a position of the measuring unit at a time of measuring the processing object, positional information generated by the machine tool and a generation period signal indicating a period during which the positional information is generated; an acquisition interval calculation unit that calculates a statistical value indicating an interval between acquisition periods regarding a plurality of the generation period signals acquired by the acquisition unit; an estimation unit that estimates the period during which the positional information is generated on the basis of the statistical value calculated by the acquisition interval calculation unit; and a shape calculation unit that calculates the shape of the processing object on the basis of the measurement information, the positional information, and the period estimated by the estimation unit.

According to another aspect of the present invention, a shape measuring probe is provided which is able to be attached to a machine tool. The shape measuring probe includes a measuring unit that generates measurement information of a processing object of the machine tool by capturing an image of the processing object; an acquisition unit that acquires, as information related to a position of the shape measuring probe at a time of measuring the processing object, positional information generated by the machine tool and a generation period signal indicating a period during which the positional information is generated; an acquisition interval calculation unit that calculates a statistical value indicating an interval between acquisition periods regarding a plurality of the generation period signals acquired by the acquisition unit; an estimation unit that estimates the period during which the positional information is generated on the basis of the statistical value calculated by the acquisition interval calculation unit; and an output unit that outputs the measurement information, the positional information, information related to the period estimated by the estimation unit, and the measurement information.

According to another aspect of the present invention, there is provided a shape calculation device including a measurement information acquisition unit that acquires measurement information for calculating a shape of a processing object of a machine tool generated by a measuring unit which is able to be attached to the machine tool; a positional information acquisition unit that acquires, as information related to a position of the measuring unit at a time of measuring the processing object, positional information generated by the machine tool; a signal acquisition unit that acquires a generation period signal indicating a period during which the positional information is generated from the machine tool; an acquisition interval calculation unit that calculates a statistical value indicating an interval between acquisition periods regarding a plurality of the generation period signals acquired by the acquisition unit; an estimation unit that estimates the period during which the positional information is generated on the basis of the statistical value calculated by the acquisition interval calculation unit; and a shape calculation unit that calculates the shape of the processing object on the basis of the measurement information, the positional information, and the period estimated by the estimation unit.

According to another aspect of the present invention, a shape measurement method is provided including acquiring measurement information for calculating a shape of a processing object of a machine tool output by a measuring unit which is able to be attached to the machine tool; acquiring, as information related to a position of the measuring unit at a time of measuring the processing object, positional information generated by the machine tool; acquiring, as a signal indicating a period during which the positional information is generated, a generation period signal generated by the machine tool; calculating a statistical value indicating an interval between acquisition periods regarding a plurality of the acquired generation period signals; estimating the period during which the positional information is generated on the basis of the calculated statistical value; and calculating the shape of the processing object on the basis of the acquired measurement information, the acquired positional information, and the estimated period.

According to another aspect of the present invention, a program is provided for causing a computer to execute acquiring measurement information for calculating a shape of a processing object of a machine tool output by a measuring unit which is able to be attached to the machine tool from the measuring unit; acquiring, as information related to a position of the measuring unit at a time of measuring the processing object, positional information generated by the machine tool; acquiring, as a signal indicating a period during which the positional information is generated, a generation period signal generated by the machine tool; calculating a statistical value indicating an interval between acquisition periods regarding a plurality of the acquired generation period signals; estimating the period during which the positional information is generated on the basis of the calculated statistical value; and calculating the shape of the processing object on the basis of the acquired measurement information, the acquired positional information, and the estimated period.

According to another aspect of the present invention, a method for producing a processing object is provided. The method includes generating measurement information for calculating a shape of the processing object by a measuring unit which is able to be attached to a machine tool; generating positional information related to a position of the measuring unit at a time of measuring the processing object; acquiring a generation period signal indicating a period during which the positional information is generated; calculating a statistical value indicating an interval between acquisition periods regarding a plurality of the acquired generation period signals; and calculating the shape of the processing object on the basis of the acquired measurement information, the acquired positional information, and the estimated period.

DESCRIPTION OF EMBODIMENT

First Embodiment

Hereinafter, a first embodiment of the present invention will be described with reference to the drawings.

Figure 1:
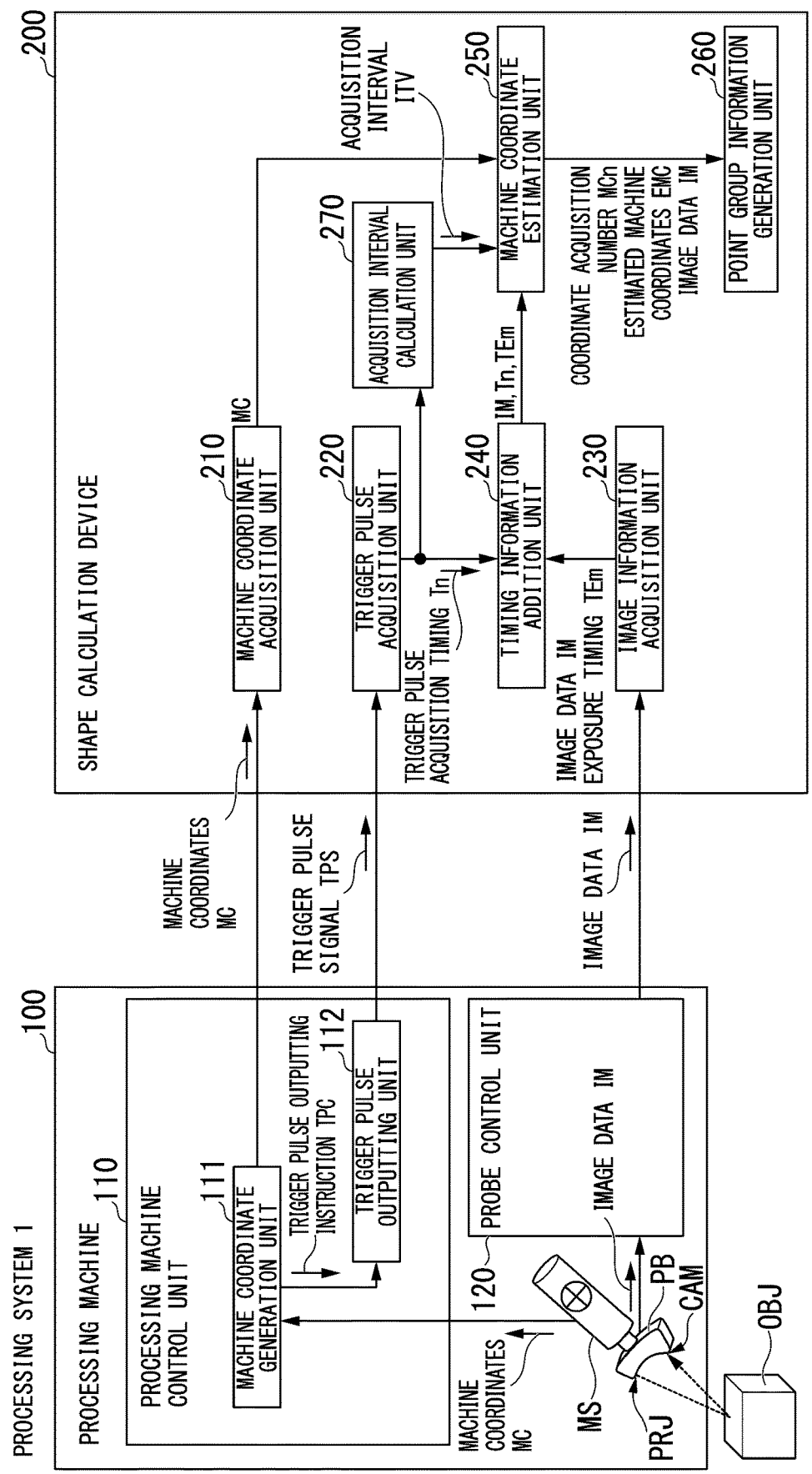
FIG. 1 is a view showing an example of a functional configuration of a processing system according to the present embodiment.

FIG. 1 is a view showing an example of a functional configuration of a processing system 1 according to the present embodiment.

[Functional Configuration of Processing System 1]

The processing system 1 includes a processing machine 100, a shape calculation device 200, and a measuring probe PB. For example, the processing machine 100 is a machine tool (for example, an NC machining tool) and performs processing of a processing object OBJ by controlling position coordinates of a tool main shaft MS. The measuring probe PB is attached to this tool main shaft MS.

The measuring probe PB can also be termed a measuring unit. In addition, the measuring probe PB is configured to be detachable in the tool main shaft MS. In addition to the measuring probe PB, a tool (for example, a cutting tool or a milling cutter) for processing the processing object OBJ is attached to the tool main shaft MS in a manner of being able to replace the measuring probe PB.

The measuring probe PB (measuring unit) includes a light projection unit PRJ and an image capturing unit CAM. The light projection unit PRJ projects line light having a line-shaped intensity distribution onto a surface of the processing object OBJ. In addition, the image capturing unit CAM captures an image of the surface of the processing object OBJ onto which line light has been projected by the light projection unit PRJ and generates image data IM. This image data IM is information output from the image capturing unit CAM. The light projection unit PRJ and the image capturing unit CAM are fixed in a common casing. Therefore, a positional relationship between a projection direction of line light from the light projection unit PRJ and an image capturing direction of the image capturing unit CAM is maintained in a fixed state. Therefore, based on the relationship between the projection direction of line light and the image capturing direction of the image capturing unit CAM, a position of the processing object OBJ in a three-dimensional space (that is, a shape of the processing object OBJ) can be obtained from the position of an image of line light detected in the image data IM on the basis of a triangulation method. Here, the image data IM is measurement information for calculating the shape of the processing object OBJ. The light projection unit PRJ includes a light source (not shown in the diagrams) and a projection optical system which modulates a spatial light intensity distribution of light emitted from the light source into a line shape and projects the modulated light onto the processing object OBJ. As an example, the light source includes a laser diode, and the projection optical system is constituted of a plurality of optical elements including a cylindrical lens. Light emitted from the laser diode diffuses in a direction in which the cylindrical lens has positive power and is emitted in the projection direction. The image capturing unit CAM includes an image capturing element (not shown in the diagrams) and an image forming optical system which forms an image of the processing object OBJ, onto which line light has been projected from the light projection unit PRJ, in the image capturing element. The image capturing element outputs a signal having a predetermined intensity for each pixel on the basis of the captured image of the processing object OBJ. As an example, the image capturing element is a solid-state image capturing element such as a CCD or a CMOS, and the image forming optical system is constituted of a plurality of optical elements such as lenses. The image capturing unit CAM generates a series of signals mapped with the coordinates of respective pixels on the basis of a signal output from the image capturing element, and the image capturing unit CAM generates data based on the signal as the image data IM.

Here, description will be given on the assumption that the image data IM is information (for example, information for generating a two-dimensional image) in which values (for example, pixel values) of signals having a predetermined intensity and output from pixels of the image capturing element are configured to be associated with the coordinates of the pixels, but the embodiment is not limited thereto. The image data IM may be data processed through existing processing on the basis of a signal output from the image capturing element or may be an unprocessed signal output from the image capturing element.

In the example of the present embodiment, the generated image data IM is used for three-dimensional shape measurement of the processing object OBJ performed by an optical cutting method. Here, an optical cutting method is a non-contact three-dimensional shape measurement method for geometrically obtaining the position coordinates of the surface of the processing object OBJ through triangulation utilizing an image of line light on the surface of the processing object OBJ onto which the line light has been projected (that is, the image data IM including an image of line light on the surface of the processing object OBJ) by projecting line light (light having a line shape when it is projected onto a plane) onto the surface of the processing object OBJ from the measuring probe PB. In the example of the present embodiment, the position coordinates of the entire surface of the processing object OBJ are obtained by relatively moving the measuring probe PB and the processing object OBJ. As described above, in the example of the present embodiment, since the measuring probe PB is attached to the tool main shaft MS, the position coordinates of the measuring probe PB can be obtained by obtaining the position coordinates of the tool main shaft MS (in the following description, they are also described as machine coordinates MC). These machine coordinates MC are an example of positional information related to the position of the measuring probe PB at the time of measuring the processing object OBJ. The processing system 1 shown in the example of the present embodiment measures a three-dimensional shape of the processing object OBJ on the basis of the machine coordinates MC and the image data IM generated by the measuring probe PB at these machine coordinates MC.

Here, the machine coordinates MC are generated by the processing machine 100 performing position control of the tool main shaft MS, and the image data IM is generated by the measuring probe PB. That is, a device generating the machine coordinates MC and a device generating the image data IM are devices which are separate from each other. For this reason, it is difficult to make a timing of generating the machine coordinates MC and a timing of generating the image data IM be strictly and continuously synchronized with each other, and thus a fluctuation (in other words, an incidental error, that is, a so-called jitter δ) occurs between these two timings. When this jitter δ occurs, an error occurs in measurement results of the three-dimensional shape calculated on the basis of the image data IM generated by the measuring probe PB. Hereinafter, a mechanism in which the processing system 1 of the present embodiment reduces an error occurring in measurement results of the three-dimensional shape due to the jitter δ will be described.

In the present embodiment, a case in which the processing system 1 measures a three-dimensional shape by an optical cutting method will be described as an example, but the embodiment is not limited thereto. Even in a shape measurement method other than the optical cutting method, the foregoing problem due to the jitter δ occurs when a device generating information (for example, the image data IM) indicating the shape of the processing object OBJ and a device generating information (for example, the machine coordinates MC) indicating the position where this information is generated are devices which are separate from each other. That is, the processing system 1 may measure the shape of the processing object OBJ by a known non-contact shape measurement method or a known contact shape measurement method other than an optical cutting method.

The processing system 1 also functions as a shape measurement system generating information indicating the shape of the processing object OBJ.

[Functional Configuration of Processing Machine 100]

The processing machine 100 includes a processing machine control unit 110 and a probe control unit 120. The processing machine control unit 110 includes a machine coordinate generation unit 111 and a trigger pulse outputting unit 112 as functional units thereof. Here, the processing machine control unit 110 may realize functions of the machine coordinate generation unit 111 and the trigger pulse outputting unit 112 using hardware or may realize the functions thereof using software. In addition, the processing machine control unit 110 may realize some of the functions of the machine coordinate generation unit 111 and the trigger pulse outputting unit 112 using hardware or may realize some other portions of the functions thereof using software. When the processing machine control unit 110 realizes some or all of the functions of the machine coordinate generation unit 111 and the trigger pulse outputting unit 112 using hardware, they may be realized using an ASIC or a programmable logic device. In addition, the processing machine control unit 110 may integrally realize all the functions of the machine coordinate generation unit 111 and the trigger pulse outputting unit 112 or may realize some of the functions thereof in an unintegrated manner.

In this example, the processing machine control unit 110 includes a computation unit such as a microprocessor and realizes some of the functions of the machine coordinate generation unit 111 and the trigger pulse outputting unit 112 using software.

The processing machine control unit 110 relatively moves the tool main shaft MS with respect to the processing object OBJ by controlling a driving device (not shown in the diagrams). The machine coordinate generation unit 111 generates the machine coordinates MC indicating current position coordinates of the tool main shaft MS in a predetermined cycle Tgen. These machine coordinates MC may be coordinates of a gauge line on the tool main shaft MS or may be coordinates indicating any position of the measuring probe PB. This predetermined cycle Tgen is 4 [msec], for example. In this example, the machine coordinate generation unit 111 detects the current position coordinates of the tool main shaft MS every 4 [msec] and generates the machine coordinates MC indicating the position coordinates.

The machine coordinate generation unit 111 outputs the generated machine coordinates MC to the shape calculation device 200.

In addition, when the machine coordinates MC are generated, the machine coordinate generation unit 111 outputs a trigger pulse outputting instruction TPC to the trigger pulse outputting unit 112. This trigger pulse outputting instruction TPC is a signal of the machine coordinate generation unit 111 instructing the trigger pulse outputting unit 112 to output a trigger pulse signal TPS. A timing when the machine coordinate generation unit 111 generates the machine coordinates MC is set based on an elapsed time from a reference moment or the like in addition to a moment when the machine coordinates MC are generated, an elapsed time from when operation of the processing machine 100 has started, an elapsed time from when operation of the measuring probe PB has started, an elapsed time from when operation of the shape calculation device 200 has started, or the like.

In addition, a timing will also be referred to as a period. That is, a timing when the machine coordinate generation unit 111 generates the machine coordinates MC may also be referred to as a period during which the machine coordinate generation unit 111 generates the machine coordinates MC.

For example, a case in which moments are synchronized with each other will be described as an example in which a timing of generating the machine coordinates MC and a timing of generating the image data IM are synchronized with each other. In this case, each of the processing machine 100 and the measuring probe PB independently has a time piece, and a moment of generating the machine coordinates MC and a moment of generating the image data IM are synchronized with each other.

The trigger pulse outputting unit 112 outputs the trigger pulse signal TPS to the shape calculation device 200 in accordance with the trigger pulse outputting instruction TPC output by the machine coordinate generation unit 111. Specifically, when the trigger pulse outputting instruction TPC is output from the machine coordinate generation unit 111, the trigger pulse outputting unit 112 detects the trigger pulse outputting instruction TPC. When the trigger pulse outputting instruction TPC is detected, the trigger pulse outputting unit 112 outputs the trigger pulse signal TPS to the shape calculation device 200. This trigger pulse signal TPS is a signal indicating a timing when (a period during which) the machine coordinates MC are generated by the machine coordinate generation unit 111. This trigger pulse signal TPS will also be referred to as a generation period signal. In addition, the trigger pulse signal TPS can also be termed a signal indicating that the machine coordinates MC are generated or can also be termed a signal indicating a timing when (a period during which) the trigger outputting instruction TPC is received.

In the example of the present embodiment, a timing when the machine coordinates MC are generated corresponds to a rising edge of the trigger pulse signal TPS. Specifically, the machine coordinate generation unit 111 raises the trigger pulse outputting instruction TPC at the timing of generating the machine coordinates MC. That is, in this case, a rising edge of the trigger pulse outputting instruction TPC indi-cates the timing when the machine coordinates MC are generated. In addition, in the example of the present embodiment, when a rising edge of the trigger pulse outputting instruction TPC is detected, the trigger pulse outputting unit 112 raises the trigger pulse signal TPS. That is, in this case, a rising edge of the trigger pulse signal TPS indicates a timing when a rising edge of the trigger pulse outputting instruction TPC is detected by the trigger pulse outputting unit 112.

Figure 2:
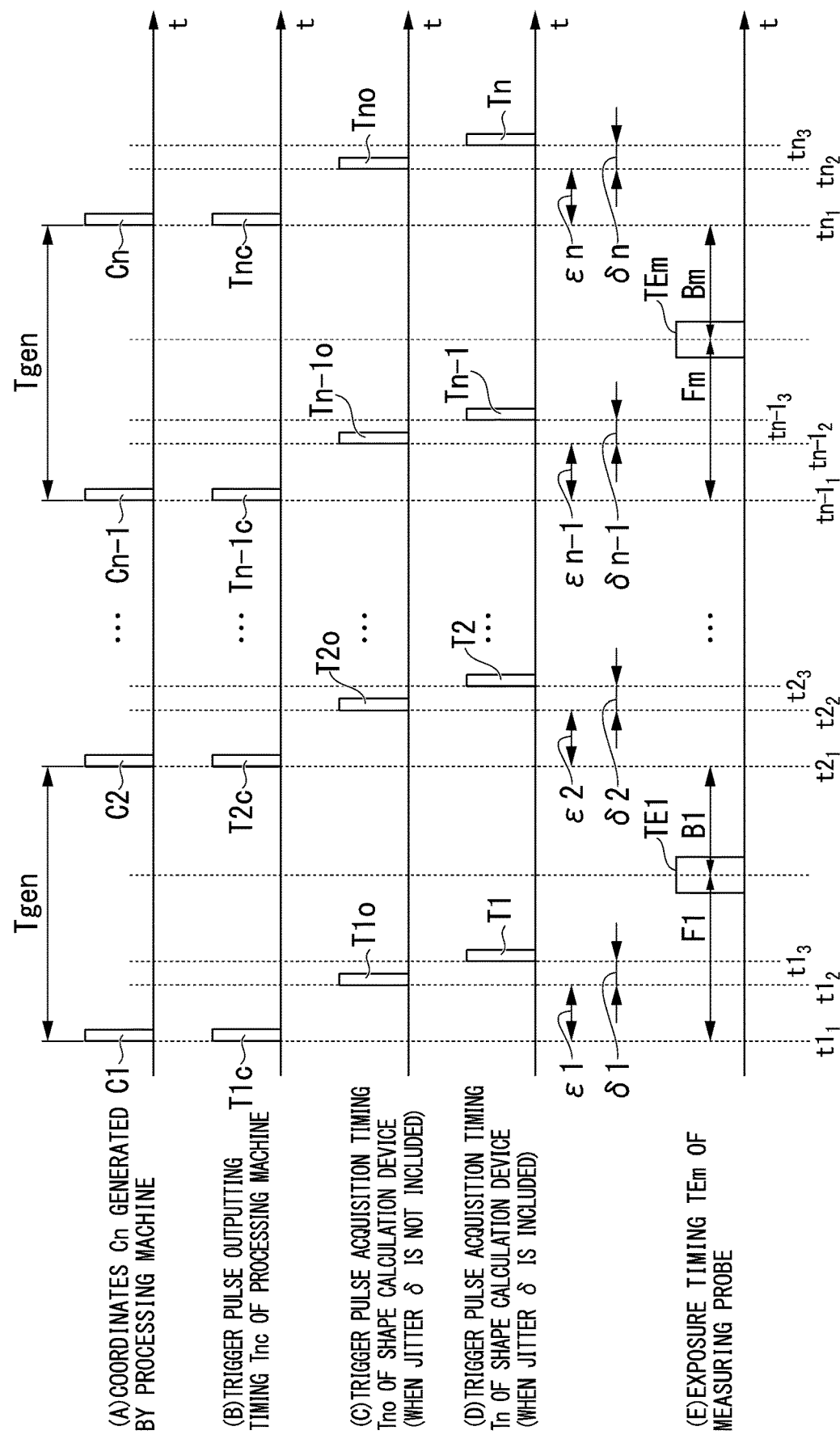
FIG. 2 is a view showing operation timings of the processing system of the present embodiment.

With reference to FIG. 2, a timing when the machine coordinate generation unit 111 generates the machine coordinates MC and a timing when the trigger pulse outputting unit 112 outputs the trigger pulse signal TPS will be described.

FIG. 2 is a view showing operation timings of the processing system 1 of the present embodiment. For example, the machine coordinates MC generated by the machine coordinate generation unit 111 are expressed as coordinates Cn as shown in FIG. 2(A). As described above, the machine coordinate generation unit 111 generates the machine coordinates MC indicating the current position coordinates of the tool main shaft MS in the cycle Tgen. The machine coordinate generation unit 111 generates coordinates C1 as the machine coordinates MC at a moment $t1_1$. In this case, the moment $t1_1$ is a timing of generating the coordinates C1. When the coordinates C1 are generated, the machine coordinate generation unit 111 outputs the trigger pulse outputting instruction TPC to the trigger pulse outputting unit 112. When this signal is acquired, the trigger pulse outputting unit 112 outputs the trigger pulse signal TPS at a moment $t1_2$. In this case, a trigger pulse outputting timing $T1c$ of the coordinates C1 is the moment $t1_2$. That is, in this case, a delay error (moment $t1_2$−moment $t1_1$) occurs between the timing of generating the coordinates C1 and the trigger pulse outputting timing $T1c$.

Returning to FIG. 1, description regarding the functional configuration of the processing system 1 will be continued. The probe control unit 120 controls projection operation of line light performed by the light projection unit PRJ of the measuring probe PB and an image capturing operation performed by the image capturing unit CAM such that they are synchronized with each other. Due to synchronous control of the probe control unit 120 over the projection operation of the light projection unit PRJ and the image capturing operation of the image capturing unit CAM, while line light is projected onto the processing object OBJ from the light projection unit PRJ, the image capturing unit CAM can capture an image thereof. In this example, the measuring probe PB captures an image of the processing object OBJ every 30 [msec] in accordance with control of the probe control unit 120. That is, in the case of this example, an image capturing cycle of the measuring probe PB is 30 [msec].

As an example, the probe control unit 120 outputs an image capturing instruction signal to the image capturing unit CAM. When an image capturing instruction signal is output from the probe control unit 120, the image capturing unit CAM captures an image of the processing object OBJ and generates the image data IM based on the intensity of a signal output from each pixel of the image capturing element. The measuring probe PB (image capturing unit CAM) outputs generated image data IM to the probe control unit 120. In the following description, a timing when the image capturing unit CAM captures an image of the processing object OBJ on the basis of an image capturing instruction signal output from the probe control unit 120 will also be referred to as an exposure timing of the image capturing unit CAM. The exposure timing of the image capturing unit CAM can also be termed a timing when an image of the processing object OBJ is captured by the image capturing unit CAM and can also be termed a timing when the image data IM is generated by the image capturing unit CAM.

The probe control unit 120 acquires the image data IM generated by the image capturing unit CAM. The probe control unit 120 causes the acquired image data IM and an exposure timing TEm of the image capturing unit CAM regarding the acquired image data IM to be associated with each other and outputs a result to the shape calculation device 200.

In the example of the present embodiment, description will be given on the assumption that the probe control unit 120 is included in the processing machine 100, but the embodiment is not limited thereto. The probe control unit 120 may be built into the measuring probe PB or may be included in a device other than the processing machine 100 (for example, the shape calculation device 200).

[Functional Configuration of Shape Calculation Device 200]

The shape calculation device 200 includes a machine coordinate acquisition unit 210, a trigger pulse acquisition unit 220, an image information acquisition unit 230, a timing information addition unit 240, a machine coordinate estimation unit 250, and a point group information generation unit 260 as functional units thereof. Here, the shape calculation device 200 may realize the functions of the machine coordinate acquisition unit 210, the trigger pulse acquisition unit 220, the image information acquisition unit 230, the timing information addition unit 240, the machine coordinate estimation unit 250, and the point group information generation unit 260 using hardware or may realize the functions thereof using software. In addition, the processing machine control unit 110 may realize some of the functions thereof using hardware or may realize some other portions of the functions thereof using software. When the processing machine control unit 110 realizes some or all of the functions thereof using hardware, they may be realized using an ASIC or a programmable logic device. In addition, the processing machine control unit 110 may integrally realize all the functions thereof or may realize some of the functions thereof in an unintegrated manner.

In this example, the shape calculation device 200 is a personal computer, for example, and realizes some of the functions of the machine coordinate acquisition unit 210, the trigger pulse acquisition unit 220, the image information acquisition unit 230, the timing information addition unit 240, the machine coordinate estimation unit 250, and the point group information generation unit 260 using software.

The machine coordinate acquisition unit 210 acquires the machine coordinates MC output by the machine coordinate generation unit 111. The machine coordinate acquisition unit 210 outputs the acquired machine coordinates MC to the machine coordinate estimation unit 250.

The trigger pulse acquisition unit 220 acquires the trigger pulse signal TPS output by the trigger pulse outputting unit 112. The trigger pulse acquisition unit 220 acquires the trigger pulse signal TPS on the assumption that the rising edge of the trigger pulse signal TPS is the timing when the machine coordinates MC are generated. In other words, the trigger pulse acquisition unit 220 acquires the trigger pulse signal TPS on the assumption that the rising edge of the trigger pulse signal TPS is a period during which the machine coordinates MC are generated.

Having the rising edge of the trigger pulse signal TPS as the timing when the machine coordinates MC are generated is an example. The trigger pulse acquisition unit 220 may take a falling edge of the trigger pulse signal TPS as the timing when the machine coordinates MC are generated or may take an intermediate part of the rising edge and the falling edge of the trigger pulse signal TPS as the timing when the machine coordinates MC are generated.

In addition, the trigger pulse acquisition unit 220 generates a trigger pulse acquisition timing Tn. This trigger pulse acquisition timing Tn is a time stamp indicating a timing when the trigger pulse acquisition unit 220 acquires the trigger pulse signal TPS. In this case, the trigger pulse acquisition timing Tn is expressed as a moment or a time when the trigger pulse acquisition unit 220 acquires the trigger pulse signal TPS.

Specifically, the trigger pulse acquisition timing Tn is indicated as a moment when the trigger pulse acquisition unit 220 acquires the trigger pulse signal TPS, an elapsed time from when operation of the shape calculation device 200 has started, or the like.

The trigger pulse acquisition unit 220 outputs the trigger pulse acquisition timing Tn to the timing information addition unit 240.

Here, with reference to FIG. 2, the trigger pulse acquisition timing Tn will be described. First, a systematic error ε and the jitter δ will be described.

[Systematic Error ε and Jitter δ]

The processing machine control unit 110 and the shape calculation device 200 are computer devices which are separated from each other. Therefore, a temporal delay, that is, an error occurs in giving and taking a signal or information between the processing machine control unit 110 and the shape calculation device 200. This error includes the systematic error ε which depends on the configuration of the processing system 1 and does not change for a long period of time and the jitter δ which changes in a short period of time. This jitter δ is also referred to as an incidental error. Here, a systematic error is an error occurring during repetition of a series of processes including generation of the machine coordinates MC and outputting of the trigger pulse outputting instruction TPC performed by the machine coordinate generation unit 111, outputting of the trigger pulse signal TPS performed by the trigger pulse outputting unit 112, and acquisition of the trigger pulse signal TPS performed by the trigger pulse acquisition unit 220, and the error is constant (substantially constant) without any change. An incidental error is an error occurring during repetition of the series of processes described above from generation of the machine coordinates MC to acquisition of the trigger pulse signal TPS, and the error changes (varies). That is, since the jitter δ is not a systematic error but is an incidental error, the jitter δ is an error occurring during repetition of the series of processes described above from generation of the machine coordinates MC to acquisition of the trigger pulse signal TPS, and the error changes (varies). FIG. 2(C) shows a trigger pulse acquisition timing Tno when the jitter δ is not included, that is, when only the systematic error ε is included. FIG. 2(D) shows the trigger pulse acquisition timing Tn when the jitter δ is included in addition to the systematic error ε.

Returning to FIG. 1, the trigger pulse acquisition unit 220 outputs the trigger pulse acquisition timing Tn to the timing information addition unit 240 and an acquisition interval calculation unit 270.

The image information acquisition unit 230 acquires the image data IM and the exposure timing TEm output by the probe control unit 120. The image information acquisition unit 230 outputs the image data IM and the exposure timing TEm which have been acquired to the timing information addition unit 240.

The timing information addition unit 240 acquires the image data IM and the exposure timing TEm from the image information acquisition unit 230. In addition, the timing information addition unit 240 acquires the trigger pulse acquisition timing Tn from the trigger pulse acquisition unit 220. The timing information addition unit 240 causes the image data IM, the exposure timing TEm, and the trigger pulse acquisition timing Tn to be associated with each other and outputs a result to the machine coordinate estimation unit 250.

The acquisition interval calculation unit 270 calculates an average value of time intervals between the timings when the trigger pulse acquisition unit 220 acquires the trigger pulse signal TPS, that is, an average acquisition interval ITV. Specifically, the acquisition interval calculation unit 270 acquires the trigger pulse acquisition timing Tn from the trigger pulse acquisition unit 220 every time the trigger pulse acquisition unit 220 acquires the trigger pulse signal TPS. The acquisition interval calculation unit 270 calculates a time difference between timings of acquiring two trigger pulse signals TPS of which the timings are adjacent to each other. For example, when the timings of acquiring two trigger pulse signals TPS of which the timings are adjacent to each other are the trigger pulse acquisition timing Tn and a trigger pulse acquisition timing Tn+1, the acquisition interval calculation unit 270 calculates a time difference between the trigger pulse acquisition timing Tn and the trigger pulse acquisition timing Tn+1. The acquisition interval calculation unit 270 performs statistical computation with respect to the calculated time difference and calculates an acquisition interval between the trigger pulse signals TPS. In this example, the acquisition interval calculation unit 270 calculates an average value of the time differences as the average acquisition interval ITV between the trigger pulse signals TPS.

The acquisition interval calculation unit 270 calculates, as an average jitter $\delta_{AVE}$, a difference between the calculated average acquisition interval ITV and a cycle set in advance as an output cycle of the trigger pulse signal TPS in the processing machine control unit 110. In the specific example of the present embodiment, a cycle set in advance as an output cycle of the trigger pulse signal TPS in the processing machine control unit 110 is 4 [msec]. In the case of this specific example, the acquisition interval calculation unit 270 calculates the average jitter $\delta_{AVE}$ by subtracting 4 [msec] from the calculated average acquisition interval ITV.

The acquisition interval calculation unit 270 need only perform statistical computation regarding a time difference between trigger pulse acquisition timings and may calculate a value such as a median value, the most frequent value, or the like in a time difference between trigger pulse acquisition timings as an acquisition interval between the trigger pulse signals TPS in addition to the average acquisition interval ITV described above.

In addition, the acquisition interval calculation unit 270 may evaluate the accuracy of the acquisition interval between the trigger pulse signals TPS on the basis of dispersion of a frequency distribution, a standard deviation, or the like of the time difference between trigger pulse acquisition timings. For example, the acquisition interval calculation unit 270 may obtain frequency distributions of the time difference over a plurality of times and calculate an acquisition interval on the basis of a frequency distribution having the smallest dispersion of the plurality of obtained frequency distributions. In addition, for example, the acquisition interval calculation unit 270 may change reliability of the generated machine coordinates MC in accordance with the magnitude of dispersion of the frequency distribution or the magnitude of the standard deviation.

The acquisition interval calculation unit 270 outputs the calculated average jitter $\delta_{AVE}$ to the machine coordinate estimation unit 250.

The machine coordinate estimation unit 250 estimates a trigger pulse outputting timing Tnc, that is, a timing when the machine coordinates MC (coordinates Cn) are generated, on the basis of the average jitter $\delta_{AVE}$ and the systematic error ε. The machine coordinate estimation unit 250 estimates the coordinates of the measuring probe PB at the exposure timing TEm of the image data IM on the basis of estimation results of the trigger pulse outputting timing Tnc. Specifically, the machine coordinate estimation unit 250 acquires each of the machine coordinates MC output by the machine coordinate acquisition unit 210, the trigger pulse acquisition timing Tn and the exposure timing TEm output by the timing information addition unit 240, and the average jitter $\delta_{AVE}$ output by the acquisition interval calculation unit 270. In addition, the machine coordinate estimation unit 250 may acquire the image data IM output by the timing information addition unit 240.

The machine coordinate estimation unit 250 corrects the trigger pulse acquisition timing Tn associated with the image data IM on the basis of the average jitter $\delta_{AVE}$ and the systematic error ε which has been obtained in advance in each piece of acquired information. As an example in the present embodiment, the machine coordinate estimation unit 250 estimates the trigger pulse acquisition timing Tno which does not include the jitter δ but includes the systematic error ε by subtracting a time corresponding to the average jitter $\delta_{AVE}$ from the trigger pulse acquisition timing Tn. An estimated value of this trigger pulse acquisition timing Tno is also referred to as an estimated trigger pulse acquisition timing ATn. That is, the machine coordinate estimation unit 250 calculates the estimated trigger pulse acquisition timing ATn by subtracting a time corresponding to the average jitter $\delta_{AVE}$ from the trigger pulse acquisition timing Tn. Moreover, the machine coordinate estimation unit 250 estimates the trigger pulse outputting timing Tnc, that is, a timing when the machine coordinates MC (coordinates Cn) are generated by subtracting the systematic error ε from the calculated estimated trigger pulse acquisition timing ATn. The machine coordinate estimation unit 250 adopts the estimated trigger pulse outputting timing Tnc as the trigger pulse acquisition timing Tn after correction.

The machine coordinate estimation unit 250 estimates the coordinates of the measuring probe PB at the exposure timing TEm on the basis of the trigger pulse acquisition timing Tn and the exposure timing TEm after correction. The machine coordinate estimation unit 250 outputs the estimated coordinates as estimated machine coordinates EMC together with the image data IM to the point group information generation unit 260.

The point group information generation unit 260 acquires the image data IM output by the machine coordinate estimation unit 250 and the estimated machine coordinates EMC. The point group information generation unit 260 calculates a shape of the processing object OBJ (that is, calculates coordinates of a point group) by a known triangulation technique on the basis of the acquired image data IM and the estimated machine coordinates EMC of the measuring probe PB.

Next, an example of an operation flow of the processing system 1 will be described with reference to FIG. 3.

[Operation Flow of Processing System 1]

Figure 3:
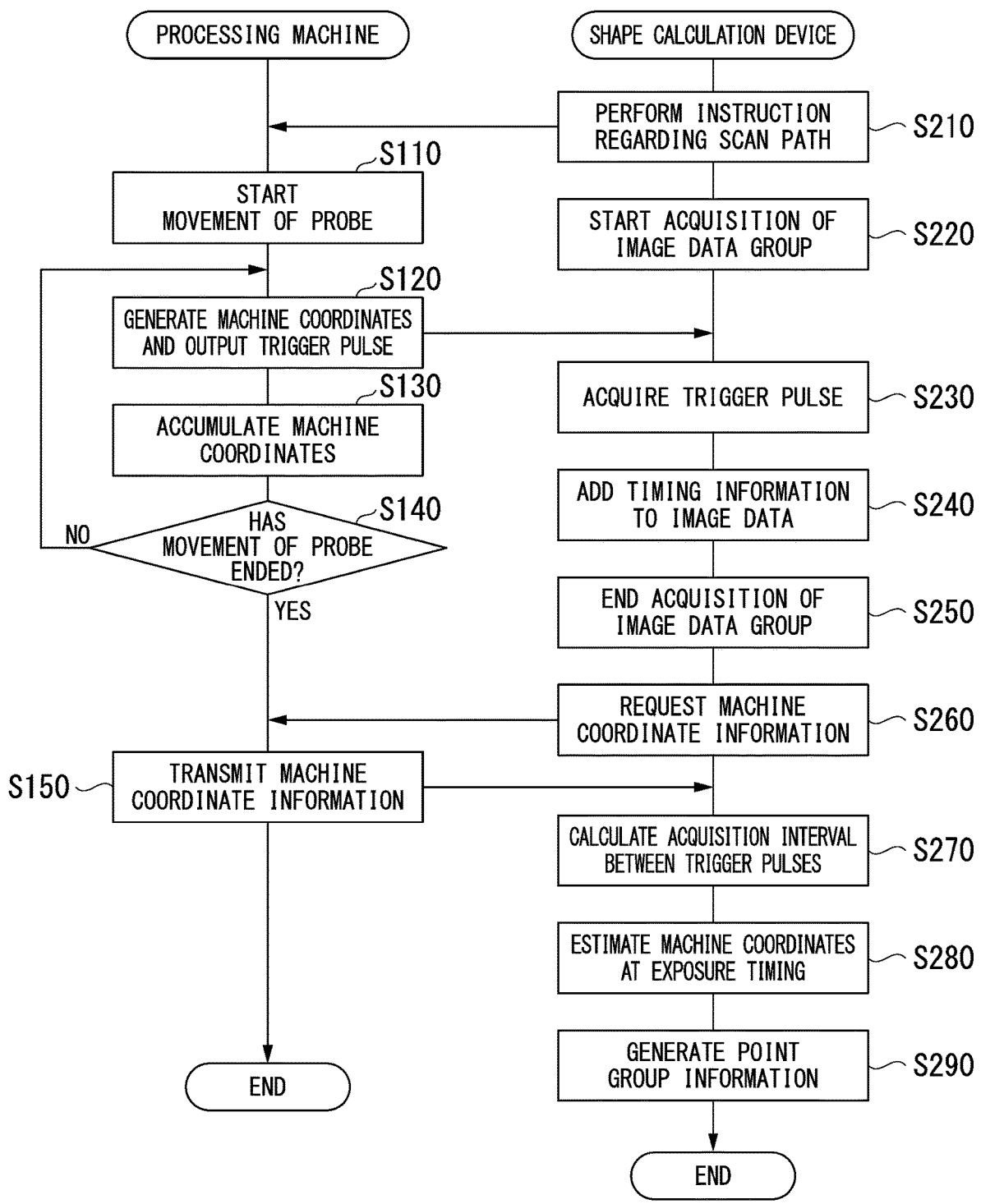
FIG. 3 is a view showing an example of an operation flow of the processing system of the present embodiment.

FIG. 3 is a view showing an example of an operation flow of the processing system 1 of the present embodiment.

(Step S210) The shape calculation device 200 instructs the processing machine 100 regarding a scan path of the measuring probe PB.

(Step S110) The processing machine control unit 110 of the processing machine 100 starts movement of the measuring probe PB based on the scan path instructed in Step S210. The probe control unit 120 starts image capturing using the image capturing unit CAM. The probe control unit 120 causes the image capturing unit CAM to capture an image in a predetermined cycle. In this example, a predetermined cycle is 30 [msec]. The probe control unit 120 causes the generated image data IM and this exposure timing TEm of the image capturing unit CAM to be associated with each other and sequentially outputs results to the shape calculation device 200.

(Step S220) The image information acquisition unit 230 of the shape calculation device 200 acquires the image data IM and the exposure timing TEm output from the probe control unit 120. The image information acquisition unit 230 causes the image data IM and the exposure timing TEm which have been acquired to be associated with each other and to be sequentially stored in a storage unit (not shown in the diagrams) of the shape calculation device 200.

(Step S120) The machine coordinate generation unit 111 of the processing machine control unit 110 acquires the position of the measuring probe PB in the predetermined cycle Tgen and generates the machine coordinates MC indicating the position of this measuring probe PB. In this example, the predetermined cycle Tgen is 4 [msec]. In addition, every time the machine coordinates MC are generated, the machine coordinate generation unit 111 outputs the trigger pulse outputting instruction TPC to the trigger pulse outputting unit 112. When the trigger pulse outputting instruction TPC is output from the machine coordinate generation unit 111, the trigger pulse outputting unit 112 outputs the trigger pulse signal TPS to the shape calculation device 200.

(Step S130) The machine coordinate generation unit 111 stores the generated machine coordinates MC in a storage unit (not shown in the diagrams) of the processing machine control unit 110.

(Step S140) The processing machine control unit 110 moves the measuring probe PB along the scan path instructed in Step S210. The processing machine control unit 110 repetitively executes Steps S120 and S130 while the measuring probe PB is moved on the basis of the scan path instructed in Step S210. Specifically, the processing machine control unit 110 determines whether or not the position of the measuring probe PB has reached an end point of the scan path. When the processing machine control unit 110 determines that it has not reached the end point of the scan path (Step S140; NO), the processing returns to Step S120. When the processing machine control unit 110 determines that it has reached the end point of the scan path (Step S140; YES), movement of the measuring probe PB is ended, and the processing proceeds to Step S150.

As a result, the machine coordinates MC of the measuring probe PB along the scan path are sequentially accumulated in the storage unit (not shown in the diagrams) of the processing machine control unit 110.

(Step S230) The trigger pulse acquisition unit 220 of the shape calculation device 200 acquires the trigger pulse signal TPS output in Step S120.

(Step S240) The timing information addition unit 240 causes the trigger pulse acquisition timing Tn generated by the trigger pulse acquisition unit 220 and the image data IM and the exposure timing TEm acquired by the image information acquisition unit 230 to be associated with each other and to be sequentially stored in the storage unit (not shown in the diagrams) of the shape calculation device 200.

(Step S250) When movement of the measuring probe PB along the scan path is ended and outputting of the trigger pulse signal TPS from the processing machine 100 is stopped, the shape calculation device 200 ends acquiring of the image data IM.

(Step S260) The shape calculation device 200 requests outputting of the machine coordinates MC accumulated in the storage unit (not shown in the diagrams) of the processing machine control unit 110 to the processing machine 100.

(Step S150) The machine coordinate generation unit 111 collectively outputs the machine coordinates MC accumulated in the storage unit (not shown in the diagrams) of the processing machine control unit 110 at the request of outputting of the machine coordinates MC in Step S260.

(Step S270) The acquisition interval calculation unit 270 of the shape calculation device 200 calculates the average acquisition interval ITV between the trigger pulse signals TPS. Moreover, the acquisition interval calculation unit 270 calculates the average jitter $\delta_{AVE}$ on the basis of the calculated average acquisition interval ITV and the output cycle of the trigger pulse signal TPS set in advance.

(Step S280) The machine coordinate estimation unit 250 of the shape calculation device 200 estimates the coordinates of the measuring probe PB at the exposure timing TEm on the basis of the average jitter $\delta_{AVE}$ calculated in Step S270. The machine coordinate estimation unit 250 outputs the estimated coordinates as the estimated machine coordinates EMC together with the image data IM to the point group information generation unit 260.

(Step S290) The point group information generation unit 260 obtains the shape of the processing object OBJ (that is, calculates coordinates of a point group) by a known triangulation technique on the basis of the image data IM and the estimated machine coordinates EMC estimated by the machine coordinate estimation unit 250.

In the example described above, the processing machine 100 accumulates the generated machine coordinates MC in the storage unit (not shown in the diagrams) and collectively outputs the accumulated machine coordinates MC to the shape calculation device 200 on the basis of a request from the shape calculation device 200, but the embodiment is not limited thereto. The processing machine 100 may output the generated machine coordinates MC to the shape calculation device 200 every time the machine coordinates MC are generated (that is, without accumulating the machine coordinates MC in a storage unit).

Next, a procedure of calculating the estimated machine coordinates EMC performed by the machine coordinate estimation unit 250 in Step S280 will be described in more detail.

[Regarding Factors of Deterioration in Accuracy of Point Group Information]

As described above, the point group information generation unit 260 generates point group information of the processing object OBJ on the basis of the position coordinates of the measuring probe PB at the exposure timing of the image capturing unit CAM. In the following description, association between an exposure timing of the image capturing unit CAM and position coordinates of the measuring probe PB at the timing will be described as "mapping" or "matching".

The image data IM and the position coordinates of the measuring probe PB are mapped with each other on the basis of the exposure timing TEm of the image capturing unit CAM and a timing when the position coordinates of the measuring probe PB are generated. As described above, after the position coordinates (that is, the machine coordinates MC) of the measuring probe PB are generated, the trigger pulse signal TPS is output. This trigger pulse signal TPS is output from the trigger pulse outputting unit 112 when the trigger pulse outputting unit 112 detects the trigger pulse outputting instruction TPC output at a timing when the machine coordinate generation unit 111 generates the machine coordinates MC. For instance, when both the systematic error and the jitter δ of the processing system 1 are 0 (zero), the trigger pulse acquisition timing Tn indicates a true timing when the machine coordinates MC are generated. When it is assumed that both the systematic error ε and the jitter δ are 0 (zero) in this manner, the machine coordinates MC and the exposure timing TEm of the image capturing unit CAM can be mapped with each other without any change.

However, actually, both the systematic error ε and the jitter δ of the processing system 1 are not 0 (zero).

Here, as shown in FIG. 2, as an example in the present embodiment, the moment $t1_2$ is a trigger pulse acquisition timing T1o in a case of not including the jitter δ1, and a moment $t1_3$ is a trigger pulse acquisition timing T1 in a case of including the jitter δ1. That is, the time difference between the moment $t1_2$ and the moment $t1_3$ is the jitter δ1.

Specifically, a delay error (moment $t1_2$–moment $t1_1$) occurs between the timing of generating machine coordinates MC1 and the trigger pulse acquisition timing T1o. This delay error (moment $t1_2$–moment $t1_1$) includes a systematic error ε1 and does not include the jitter δ1. In addition, a delay error (moment $t1_3$–moment $t1_1$) occurs between the timing of generating the coordinates C1 and the trigger pulse acquisition timing T1. This delay error (moment $t1_3$–moment $t1_1$) includes the systematic error ε1 and the jitter δ1.

As described above, the trigger pulse signal TPS corresponding to the generated coordinates C1 is output from the trigger pulse outputting unit 112 at the trigger pulse outputting timing T1c (moment $t1_1$). In this example, the trigger pulse acquisition unit 220 acquires the trigger pulse signal TPS, which has been output at the trigger pulse outputting timing T1c (moment $t1_1$), at the trigger pulse acquisition timing T1 (moment $t1_3$). In this case, a delay error (moment $t1_3$–moment $t1_1$) occurs between the trigger pulse outputting timing T1c and the trigger pulse acquisition timing T1. That is, in this case, a delay error (moment $t1_3$–moment $t1_1$) occurs between the timing when the coordinates C1 are generated and the trigger pulse acquisition timing T1.

For this reason, a time difference occurs between the true timing when the machine coordinates MC are generated in the machine coordinate generation unit 111 and the timing when the trigger pulse acquisition unit 220 acquires the trigger pulse signal TPS. Therefore, when the image data IM and the position coordinates of the measuring probe PB are mapped with each other on the basis of the timing when the trigger pulse acquisition unit 220 acquires the trigger pulse signal TPS, positional accuracy of the point group information includes an error derived from the systematic error ε and the jitter δ. For example, as shown in FIG. 2, a time difference corresponding to a systematic error εn and a jitter δn occurs between the trigger pulse outputting timing Tnc which is a true timing when the coordinates Cn are generated in the machine coordinate generation unit 111 and the trigger pulse acquisition timing Tn which is a timing when the trigger pulse acquisition unit 220 acquires the trigger pulse signal TPS. For instance, when the image data IM and the position coordinates of the measuring probe PB are mapped with each other on the assumption that the coordinates Cn are generated at the trigger pulse acquisition timing Tn, the position coordinates of the measuring probe PB mapped with the image data IM indicate a position which deviates from true position coordinates as according to the time difference between the systematic error εn and the jitter δn. That is, in this case, since the position coordinates of the measuring probe PB mapped with the image data IM deviate from the true position coordinates, the accuracy of shape data of a processing object calculated on the basis of this image data IM deteriorates.

The machine coordinate estimation unit 250 of the present embodiment reduces the influence of an error derived from the systematic error ε and the jitter δ described above in the following manner.

[Calculation of Estimated Machine Coordinates EMC by Machine Coordinate Estimation Unit 250]

Hereinafter, with reference to FIG. 4, the foregoing operation in Step S280 shown in FIG. 3 will be described in detail.

Figure 4:
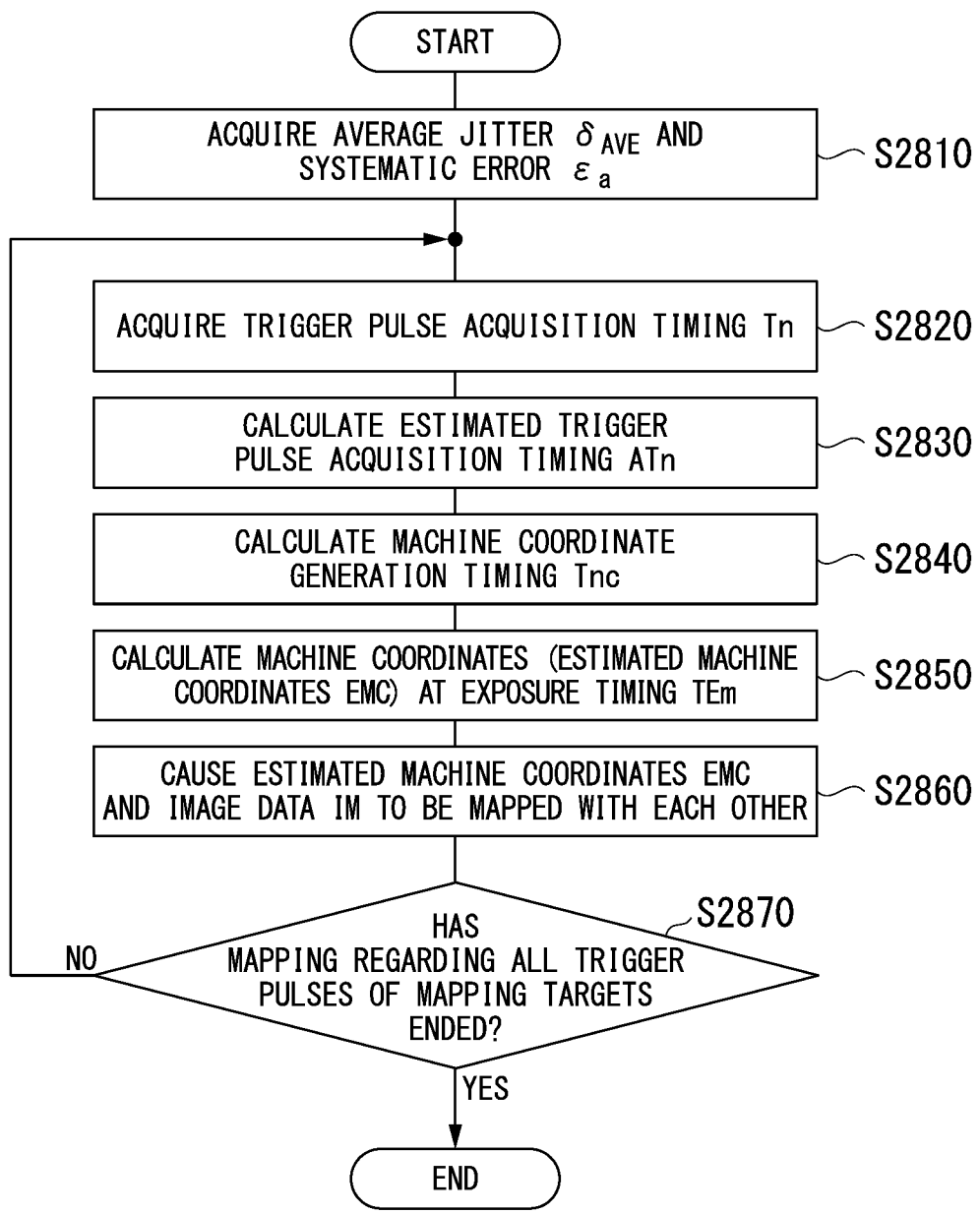
FIG. 4 is a view showing an example of a procedure of calculating estimated machine coordinates performed by a machine coordinate estimation unit of the present embodiment.

FIG. 4 is a view showing an example of a procedure of calculating the estimated machine coordinates EMC performed by the machine coordinate estimation unit 250 of the present embodiment.

(Step S2810) The machine coordinate estimation unit 250 acquires the average jitter $δ_{AVE}$ calculated by the acquisition interval calculation unit 270 and the systematic error ε stored in the storage unit (not shown in the diagrams).

[Acquisition of Systematic Error ε]

Here, a procedure of acquiring the systematic error ε will be described with reference to FIG. 5.

Figure 5:
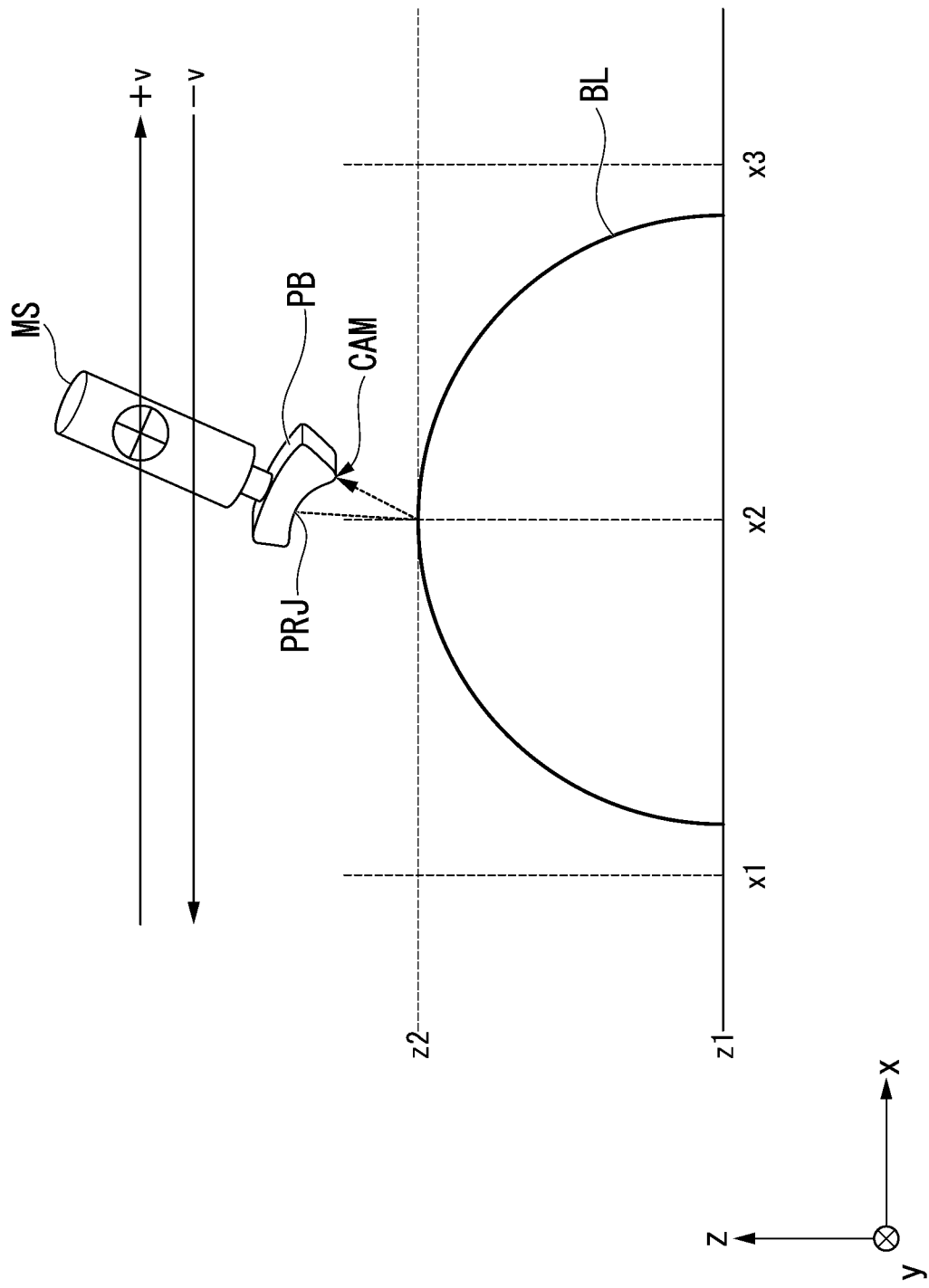
FIG. 5 is a view showing an example of a procedure of acquiring a systematic error in the present embodiment.

FIG. 5 is a view showing an example of a procedure of acquiring the systematic error ε in the present embodiment. The systematic error ε can be obtained from a difference between the position coordinates when a material having a known shape is observed using the measuring probe PB. As an example, a case in which a hemisphere BL is scanned using the measuring probe PB will be described. Specifically, a case in which the hemisphere BL is placed in an xy plane in an xyz orthogonal coordinate system shown in the same diagram and the measuring probe PB measures the height of the hemisphere BL in a z axis direction through scanning in an x axis direction will be described as an example.

When this hemisphere BL is scanned using the measuring probe PB, a coordinate difference ξ in accordance with a delay time in coordinate generation occurs between true coordinates of the hemisphere BL at an observation position of the measuring probe PB and observed coordinates of the hemisphere BL. Here, measurement is performed twice including a measurement in which a scanning direction of the measuring probe PB is set as a positive x axis direction and a measurement in which the scanning direction is set as a negative x axis direction. Specifically, a first measurement in which the measuring probe PB is moved from coordinates x1 to coordinates x3 via coordinates x2, and a second measurement in which the measuring probe PB is moved from the coordinates x3 to the coordinates x1 via the coordinates x2 are performed. When true coordinates (coordinates z2 at the coordinates x2 in the diagram) of a spherical core of the hemisphere BL is calculated on the basis of the results of two measurements, it is possible to obtain coordinates (z2+ξ) when the scanning direction is set to the positive x axis direction and coordinates (z2−ξ) when the scanning direction is set to the negative x axis direction, respectively. Here, the coordinate difference ξ is a measurement error regarding the true coordinates of the spherical core of the hemisphere BL. The value of this coordinate difference ξ is obtained by halving the difference (that is, 2ξ) between the coordinates (z2+ξ) and the coordinates (z2−ξ). Here, on the assumption that the absolute values of a movement velocity (+v) of the measuring probe PB when scanning is performed in the positive x axis direction and a movement velocity (−v) of the measuring probe PB when scanning is performed in the negative x axis direction are equivalent to each other (that is, the velocities v of movement are equivalent to each other regardless of the movement direction), the delay time, that is, the systematic error ε can be obtained on the basis of the velocity v and the coordinate difference ξ.

The machine coordinate estimation unit 250 calculates the trigger pulse outputting timing Tnc on the basis of the systematic error ε which has been obtained in advance as described above.

The shape calculation device 200 of the present embodiment stores the systematic error ε which has been obtained as described above in the storage unit (not shown in the diagrams). In the example of the present embodiment, description will be given on the assumption that the systematic error ε1 to the systematic error εn shown in FIG. 2 have a constant value and all the values thereof coincide with the systematic error E obtained through the procedure described above.

In this example, description will be given on the assumption that the systematic error ε has been obtained in advance, but the embodiment is not limited thereto. For example, the machine coordinate estimation unit 250 (or a different functional unit) may have the function of calculating the systematic error ε. As an example, there are cases in which the systematic error ε varies in value with each of the processing machines 100 or the shape calculation devices 200 or for each of the measurement moments. In such cases, before the shape of the processing object OBJ is measured, a so-called ball bar is placed on a stage as the hemisphere BL described above, and the machine coordinate estimation unit 250 (or a different functional unit) calculates the systematic error ε through the procedure described above.

(Step S2820) Returning to FIG. 4, the machine coordinate estimation unit 250 acquires the trigger pulse acquisition timing Tn corresponding to the exposure timing TEm for each piece of the image data IM. Specifically, the machine coordinate estimation unit 250 acquires the trigger pulse acquisition timing Tn, the image data IM, and the exposure timing TEm stored by the timing information addition unit 240 from the storage unit (not shown in the diagrams).

(Step S2830) The machine coordinate estimation unit 250 calculates the estimated trigger pulse acquisition timing ATn on the basis of the trigger pulse acquisition timing Tn acquired in Step S2820 and the average jitter $\delta_{AVE}$.

Here, the estimated trigger pulse acquisition timing ATn will be described with reference to FIG. 6.

Figure 6:
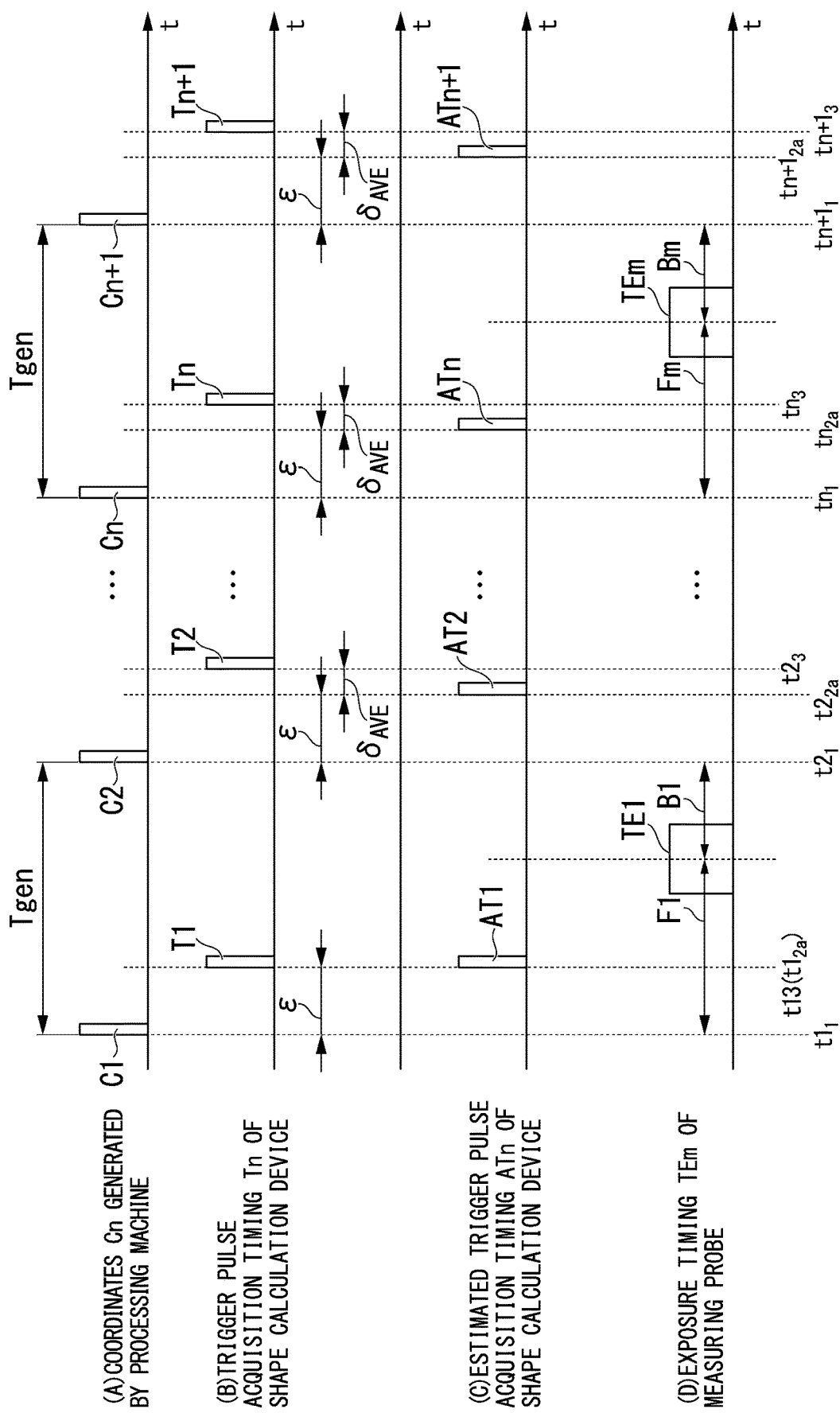
FIG. 6 is a view showing an example of an estimated trigger pulse acquisition timing of the present embodiment.

FIG. 6 is a view showing an example of the estimated trigger pulse acquisition timing ATn of the present embodiment. The systematic error ε and the jitter δ are included in the trigger pulse acquisition timing Tn acquired in Step S2820 as an error of a timing from the timing (that is, the trigger pulse outputting timing Tnc) when the coordinates Cn are generated (FIGS. 6(A) and 6(B)). As described above, the magnitude of the jitter δ of this error can change every time the trigger pulse signal TPS is output. The acquisition interval calculation unit 270 of the present embodiment calculates the average value of this jitter δ as the average jitter $\delta_{AVE}$. As shown in the same diagram, for example, the average jitter $\delta_{AVE}$ is (moment $tn_3$−moment $tn_{2a}$). The machine coordinate estimation unit 250 calculates the estimated trigger pulse acquisition timing ATn (moment $tn_{2a}$) by subtracting this average jitter $\delta_{AVE}$ from the trigger pulse acquisition timing Tn (moment $tn_3$) (FIG. 6(C)). Similar to the estimated trigger pulse acquisition timing ATn, the machine coordinate estimation unit 250 calculates an estimated trigger pulse acquisition timing AT2 to an estimated trigger pulse acquisition timing ATn+1.

Regarding an estimated trigger pulse acquisition timing AT1, the machine coordinate estimation unit 250 performs calculation on the assumption that the jitter δ is 0 (zero). That is, the machine coordinate estimation unit 250 calculates the trigger pulse acquisition timing T1 as the estimated trigger pulse acquisition timing AT1.

(Step S2840) The machine coordinate estimation unit 250 calculates the estimated trigger pulse acquisition timing ATn by subtracting the systematic error ε from the estimated trigger pulse acquisition timing ATn.

On the assumption that the movement velocity of the measuring probe PB between a timing of generating coordinates Cn−1 and a timing of generating the coordinates Cn is known (for example, a constant velocity), the position coordinates of the measuring probe PB between these timings can be obtained through interpolation.

Here, as shown in FIG. 6(D), a case in which the exposure timing TEm is located between the timing of generating the coordinates Cn−1 and the timing of generating the coordinates Cn will be described. A time from the timing of generating the coordinates Cn−1 to the center of the exposure timing TEm will be referred to as a time Fm, and a time from the center of the exposure timing TEm to the timing of generating the coordinates Cn will be referred to as a time Bm. In this case, coordinates Cmcent of the center of the exposure timing TEm is indicated as Expression (1).

[Math 1]

(Step S2850) Returning to FIG. 4, the machine coordinate estimation unit 250 calculates the coordinates Cmcent as the estimated machine coordinates EMC by interpolating the coordinates Cn−1 and the coordinates Cn by the foregoing Expression (1).

(Step S2860) The machine coordinate estimation unit 250 causes the calculated estimated machine coordinates EMC and the image data IM to be mapped with each other.

(Step S2870) The machine coordinate estimation unit 250 determines whether or not mapping regarding the image data IM corresponding to all the trigger pulse signals TPS has ended. When the machine coordinate estimation unit 250 determines that mapping regarding the image data IM corresponding to all the trigger pulse signals TPS has not ended (Step S2870; NO), the processing returns to Step S2820. When the machine coordinate estimation unit 250 determines that mapping regarding the image data IM corresponding to all the trigger pulse signals TPS has ended (Step S2870; YES), processing of calculating the estimated machine coordinates EMC is ended.

As described above, the processing system 1 of the present embodiment includes the machine coordinate estimation unit 250. This machine coordinate estimation unit 250 estimates the timing when the machine coordinates MC are generated on the basis of the timing when the trigger pulse acquisition unit 220 acquires the trigger pulse signal TPS.

As described above, the timing of acquiring the trigger pulse signal TPS acquired by the trigger pulse acquisition unit 220 includes the systematic error $\varepsilon$ and the jitter $\delta$ with respect to a true timing of generating the machine coordinates MC. Here, if the point group information is generated without estimating the timing when the machine coordinates MC are generated on the assumption that the timing of acquiring the trigger pulse signal TPS is the timing when the machine coordinates MC are generated without any change, deterioration in positional accuracy occurs due to the systematic error $\varepsilon$ and the jitter $\delta$.

On the other hand, the processing system 1 of the present embodiment generates the point group information on the basis of the estimated machine coordinates EMC. This estimated machine coordinates EMC are machine coordinates of the measuring probe PB estimated on the basis of the timing of acquiring the trigger pulse signal TPS. Therefore, compared to a case in which the point group information is generated on the assumption that the timing of acquiring the trigger pulse signal TPS is the timing when the machine coordinates MC are generated without any change, the positional accuracy of the point group information can be improved. In other words, according to the processing system 1 of the present embodiment, deterioration in positional accuracy of the point group information can be curbed.

In addition, the processing system 1 of the present embodiment generates the estimated machine coordinates EMC on the basis of the average jitter $\delta_{AVE}$. This average jitter $\delta_{AVE}$ is calculated on the basis of the timing of acquiring the trigger pulse signal TPS which can be observed by the shape calculation device 200. That is, in the processing system 1, the shape calculation device 200 estimates the predetermined cycle Tgen in which the machine coordinate generation unit 111 generates the machine coordinates MC. Therefore, according to the processing system 1 of the present embodiment, the estimated machine coordinates EMC can be generated even if the cycle Tgen which is a generation cycle of the machine coordinates MC is not grasped by the shape calculation device 200 in advance. In addition, according to the processing system 1 of the present embodiment, even when the cycle Tgen which is a generation cycle of the machine coordinates MC has changed, the shape calculation device 200 can generate the estimated machine coordinates EMC by changing the average jitter $\delta_{AVE}$ following the change thereof.

In addition, according to the processing system 1 of the present embodiment, the shape calculation device 200 need only sequentially store timings of acquiring the trigger pulse signal TPS and obtain a statistical value (for example, an average value) of the interval between the timings, and thus complicated computation is not necessary. That is, according to the processing system 1 of the present embodiment, the estimated machine coordinates EMC can be generated with a simple configuration.

In addition, the processing system 1 of the present embodiment generates the estimated machine coordinates EMC on the basis of the systematic error $\varepsilon$. Since it is generated based on the systematic error $\varepsilon$, the processing system 1 can reduce the influence of the systematic error $\varepsilon$. Therefore, deterioration in positional accuracy of the point group information can be curbed.

In addition, as described above, in the processing system 1 of the present embodiment, the machine coordinates MC may be generated in a first cycle (for example, 4 [msec]), and the trigger pulse signal TPS may be output in a second cycle (for example, 40 [msec]) longer than the first cycle. Here, there are cases in which a computation load of the processing machine control unit 110 increases when the output cycle of the trigger pulse signal TPS by the trigger pulse outputting unit 112 is short. If the computation load of the processing machine control unit 110 increases, there are cases in which the accuracy of a timing of generating the trigger pulse signal TPS deteriorates and the jitter $\delta$ becomes larger. In the processing system 1 of the present embodiment, the computation load of the processing machine control unit 110 is reduced by causing the output cycle of the trigger pulse signal TPS to be longer than the generation cycle of the machine coordinates MC. Therefore, in the processing system 1 of the present embodiment, deterioration in accuracy of the timing of generating the trigger pulse signal TPS can be curbed and the jitter $\delta$ can be further reduced.

Modification Example

In the first embodiment described above, a case in which the MACHINE COORDINATE is estimated on the basis of a timing (exposure timing TEm) in the middle of exposure of the image capturing unit CAM has been described, but the embodiment is not limited thereto. The machine coordinate estimation unit 250 may estimate a MACHINE COORDINATE on the basis of a leading edge of the exposure timing or/and a trailing edge of the exposure timing of the image capturing unit CAM.

In this case, the machine coordinate estimation unit 250 calculates each of an average trigger leading edge cycle Taf and an average trigger trailing edge cycle Tab which are average values of trigger intervals on the basis of the trigger pulse acquisition timing T1 to the trigger pulse acquisition timing Tn which have been acquired.

Even when there is a difference between a rising time of a leading edge and a falling time of a trailing edge of these trigger pulse signals TPS, the average trigger leading edge cycle Taf becomes equivalent to the average trigger trailing edge cycle Tab. Here, computation can be performed using an average trigger cycle Taave in place of the average trigger leading edge cycle Taf and the average trigger trailing edge cycle Tab.

Here, a time from the timing of generating the coordinates Cn−1 to the leading edge of the exposure timing will be referred to as a time Fmf, and a time from the leading edge of the exposure timing to the timing of generating the coordinates Cn will be referred to as a time Bmf. In this case, a timing Cmf of the leading edge of the exposure timing is indicated as Expression (2).

[Math 2]

In addition, a time from the timing of generating the coordinates Cn−1 to the trailing edge of the exposure timing will be referred to as a time Fmb, and a time from the trailing edge of the exposure timing to the timing of generating the coordinates Cn will be referred to as a time Bmb. In this case, a timing Cmb of the trailing edge of the exposure timing is indicated as Expression (3).

[Math 3]

Here, on the assumption that the movement velocity of the measuring probe PB between the timing of generating the coordinates Cn−1 and the timing of generating the coordinates Cn is known (for example, a constant velocity), a timing Cmcent can obtained by Expression (4).

[Math 4]

The machine coordinate estimation unit 250 calculates the coordinates Cmcent obtained by Expression (4) through interpolation of the coordinates Cn−1 and the coordinates Cn as the estimated machine coordinates EMC.

When the movement velocity of the measuring probe PB is accelerated between the timing of generating the coordinates Cn−1 and the timing of generating the coordinates Cn, weight average computation can be performed as indicated in Expression (5).

[Math 5]

As described above, the machine coordinate estimation unit 250 of the present embodiment is not limited to the case based on the moment at the center of the exposure timing described in the first embodiment, and the estimated machine coordinates EMC can be calculated on the basis of the moment of the leading edge of the exposure timing or the moment of the trailing edge of the exposure timing.

In the embodiment and the modification example thereof described above, a case in which the jitter δn is included between the timing when the trigger pulse outputting unit 112 outputs the trigger pulse signal TPS and the timing when the trigger pulse acquisition unit 220 acquires the trigger pulse signal TPS has been described, but the configuration is not limited thereto. The shape measurement method described above can be used even if a jitter occurs in any period from when the machine coordinate generation unit 111 generates the machine coordinates MC until the trigger pulse acquisition unit 220 acquires the trigger pulse signal TPS. As an example, even if a jitter occurs between the timing when the machine coordinate generation unit 111 generates the machine coordinates MC and the timing when the trigger pulse outputting unit 112 outputs the trigger pulse signal TPS, the point group information generation unit 260 can calculate the shape of the processing object unit OBJ with high accuracy by the shape measurement method described above on the basis of the MACHINE COORDINATE (that is, the estimated machine coordinates EMC) estimated by the machine coordinate estimation unit 250 and the image data IM.

In the embodiment and the modification example thereof described above, the measuring probe PB is configured to be detachable from the tool main shaft MS, and the shape of the processing object OBJ is measured in a state in which the measuring probe PB is attached to the tool main shaft MS (that is, in a state in which a processing tool such as a cutting tool or a milling cutter is detached from the tool main shaft MS), but the configuration is not limited thereto. For example, a processing tool such as a cutting tool or a milling cutter may be attached to the tool main shaft MS, and the measuring probe PB may be installed in the vicinity of the tool main shaft MS. As an example, the measuring probe PB may be configured to be attached to a part different from the part to which a processing tool is attached in the tool main shaft MS. In this case, while the processing object OBJ is processed in a state in which a processing tool is attached to the tool main shaft MS, the shape of the processing object OBJ can be measured with the measuring probe PB.

In the embodiment and the modification example thereof described above, an intensity distribution of light projected onto the processing object OBJ from the light projection unit PRJ is not limited to a line shape and may be a predetermined existing intensity distribution. In addition, the configuration of each of the light projection unit PRJ and the image capturing unit CAM is not limited to the configuration described above, and a different existing configuration can be applied. In addition, regarding the measuring probe PB, a different existing probe adopting a phase shift method or a stereo method utilizing a triangulation method can be applied, and a probe adopting an existing shape measurement method other than a triangulation method, such as a lens focusing method, can be applied. In addition, for example, when a stereo method, a lens focusing method, or the like is employed, the light projection unit PRJ may be omitted, and the method need only have the image capturing unit CAM for capturing an image of the processing object OBJ. In this case, the probe control unit 120 may control the image capturing operation of the image capturing unit CAM.

Various kinds of the processing described above may be performed by recording a program for executing each step of the processing of the processing system 1 in the embodiment described above in a computer readable recording medium and causing a computer system to read and execute the program recorded in the recording medium.

The aforementioned "computer system" may include hardware such as an OS and peripheral equipment. In addition, when the WWW system is utilized, "a computer system" also includes a homepage providing environment (or a display environment). In addition, "a computer readable recording medium" indicates a writable nonvolatile memory such as a flexible disk, a magneto-optical disc, a ROM, or a flash memory; a portable medium such as a CD-ROM; or a storage device such as a hard disk built into a computer system.

Moreover, "a computer readable recording medium" also includes a medium which retains a program for a certain period of time, such as a volatile memory (for example, a dynamic random access memory (DRAM)) inside a computer system serving as a server or a client in a case in which a program is transmitted through a network such as the internet or a communication channel such as a telephone channel. In addition, the foregoing program may be transmitted to a different computer system from the computer system storing this program in a storage device or the like via a transmission medium or through transmission waves in a transmission medium. Here, "a transmission medium" transmitting a program indicates a medium having a function of transmitting information, for example, a network (communication network) such as the internet, or a communication channel (communication line) such as a telephone channel. In addition, the foregoing program may be a program for realizing some of the functions described above. Moreover, the foregoing program may be a program capable of realizing the functions described above in a combination with a program which has already been recorded in a computer system, that is, a so-called differential file (differential program).

Hereinabove, the embodiment of the present invention has been described in detail with reference to the drawings. However, the specific configuration is not limited to this embodiment and also includes design changes or the like within a range not departing from the gist of this invention.

REFERENCE SIGNS LIST

1 Processing system
100 Processing machine
110 Processing machine control unit
111 machine coordinate generation unit
112 Trigger pulse outputting unit
120 Probe control unit
200 Shape calculation device
210 machine coordinate acquisition unit
220 Trigger pulse acquisition unit 230 Image information acquisition unit
240 Timing information addition unit
250 machine coordinate estimation unit
260 Point group information generation unit
270 Acquisition interval calculation unit
PB Measuring probe
OBJ Processing object

The invention claimed is:

1. A processing system comprising:
a machine tool that includes a measuring unit outputting measurement information for calculating a shape of a processing object;
a control unit that generates positional information related to a position of the measuring unit at a time of measuring the processing object and outputs the generated positional information and a generation period signal indicating a period during which the positional information is generated;
an acquisition unit that acquires the positional information and the generation period signal which have been output;
an acquisition interval calculation unit that calculates a statistical value indicating an interval between acquisition periods regarding a plurality of the generation period signals acquired by the acquisition unit;
an estimation unit that estimates the period during which the positional information is generated on the basis of the statistical value calculated by the acquisition interval calculation unit; and
a shape calculation unit that calculates the shape of the processing object on the basis of the measurement information, the positional information, and the period estimated by the estimation unit.

2. The processing system according to claim 1,
wherein the estimation unit estimates the period during which the positional information is generated on the basis of a systematic error included in a time difference between the period during which the positional information is generated and a period during which the acquisition unit acquires the generation period signal.

3. The processing system according to claim 1,
wherein the control unit outputs the generation period signal in a second cycle longer than a first cycle of generating the positional information,
wherein the acquisition interval calculation unit calculates, as the statistical value, a value indicating an acquisition interval between the generation period signals output in the second cycle, and
wherein the estimation unit estimates the period during which the positional information is generated by estimating the first cycle on the basis of the statistical value.

4. A shape calculation system comprising:
a measuring unit that is configured to be attached to a machine tool and generates measurement information for calculating a shape of a processing object of the machine tool;
an acquisition unit that acquires, as information related to a position of the measuring unit at a time of measuring the processing object, positional information generated by the machine tool and a generation period signal indicating a period during which the positional information is generated;
an acquisition interval calculation unit that calculates a statistical value indicating an interval between acquisition periods regarding a plurality of the generation period signals acquired by the acquisition unit;
an estimation unit that estimates the period during which the positional information is generated on the basis of the statistical value calculated by the acquisition interval calculation unit; and
a shape calculation unit that calculates the shape of the processing object on the basis of the measurement information, the positional information, and the period estimated by the estimation unit.

5. A shape measuring probe which is configured to be attached to a machine tool, the shape measuring probe comprising:
a measuring unit that generates measurement information of a processing object of the machine tool by capturing an image of the processing object;
an acquisition unit that acquires, as information related to a position of the shape measuring probe at a time of measuring the processing object, positional information generated by the machine tool and a generation period signal indicating a period during which the positional information is generated;
an acquisition interval calculation unit that calculates a statistical value indicating an interval between acquisition periods regarding a plurality of the generation period signals acquired by the acquisition unit;
an estimation unit that estimates the period during which the positional information is generated on the basis of the statistical value calculated by the acquisition interval calculation unit; and
an output unit that outputs the measurement information, the positional information, information related to the period estimated by the estimation unit, and the measurement information.

6. A shape calculation device comprising:
a measurement information acquisition unit that acquires measurement information for calculating a shape of a processing object of a machine tool generated by a measuring unit which is configured to be attached to the machine tool;
a positional information acquisition unit that acquires, as information related to a position of the measuring unit at a time of measuring the processing object, positional information generated by the machine tool;
a signal acquisition unit that acquires a generation period signal indicating a period during which the positional information is generated from the machine tool;
an acquisition interval calculation unit that calculates a statistical value indicating an interval between acquisition periods regarding a plurality of the generation period signals acquired by the acquisition unit;
an estimation unit that estimates the period during which the positional information is generated on the basis of the statistical value calculated by the acquisition interval calculation unit; and
a shape calculation unit that calculates the shape of the processing object on the basis of the measurement information, the positional information, and the period estimated by the estimation unit.

7. A shape measurement method comprising:
acquiring measurement information for calculating a shape of a processing object of a machine tool output by a measuring unit which is configured to be attached to the machine tool;
acquiring, as information related to a position of the measuring unit at a time of measuring the processing object, positional information generated by the machine tool;

acquiring, as a signal indicating a period during which the positional information is generated, a generation period signal generated by the machine tool;

calculating a statistical value indicating an interval between acquisition periods regarding a plurality of the acquired generation period signals;

estimating the period during which the positional information is generated on the basis of the calculated statistical value; and calculating the shape of the processing object on the basis of the acquired measurement information, the acquired positional information, and the estimated period.

8. A non-transitory computer-readable recording medium on which is stored a program that causes a computer to execute acquiring measurement information for calculating a shape of a processing object of a machine tool, the measurement information output by a measuring unit which is configured to be attached to the machine tool;

acquiring, as information related to a position of the measuring unit at a time of measuring the processing object, positional information generated by the machine tool;

acquiring, as a signal indicating a period during which the positional information is generated, a generation period signal generated by the machine tool;

calculating a statistical value indicating an interval between acquisition periods regarding a plurality of the acquired generation period signals;

estimating the period during which the positional information is generated on the basis of the calculated statistical value; and calculating the shape of the processing object on the basis of the acquired measurement information, the acquired positional information, and the estimated period.

9. A method for producing a processing object, the method comprising:

generating measurement information for calculating a shape of the processing object by a measuring unit which is configured to be attached to a machine tool;

generating positional information related to a position of the measuring unit at a time of measuring the processing object;

acquiring a generation period signal indicating a period during which the positional information is generated;

calculating a statistical value indicating an interval between acquisition periods regarding a plurality of the acquired generation period signals; and calculating the shape of the processing object on the basis of the acquired measurement information, the acquired positional information, and the estimated period.

* * * * *